(12) United States Patent
Simpson

(10) Patent No.: US 8,677,849 B2
(45) Date of Patent: Mar. 25, 2014

(54) SPROCKET WITH DAMPER AND COMPENSATOR

(75) Inventor: Roger T. Simpson, Ithaca, NY (US)

(73) Assignee: BorgWarner, Inc., Auburn Hills, MI (US)

( * ) Notice: Subject to any disclaimer, the term of this patent is extended or adjusted under 35 U.S.C. 154(b) by 378 days.

(21) Appl. No.: 13/057,012

(22) PCT Filed: Aug. 6, 2009

(86) PCT No.: PCT/US2009/052920
§ 371 (c)(1),
(2), (4) Date: Feb. 1, 2011

(87) PCT Pub. No.: WO2010/019431
PCT Pub. Date: Feb. 18, 2010

(65) Prior Publication Data
US 2011/0132116 A1    Jun. 9, 2011

Related U.S. Application Data

(60) Provisional application No. 61/089,067, filed on Aug. 15, 2008.

(51) Int. Cl.
*F16H 55/18*  (2006.01)
(52) U.S. Cl.
USPC .................... 74/440; 74/89.21; 123/90.31
(58) Field of Classification Search
USPC ......... 74/89.21, 409, 411, 440; 474/109, 152, 474/153, 157, 159, 160; 123/90.31
See application file for complete search history.

(56) References Cited

U.S. PATENT DOCUMENTS

| | | | |
|---|---|---|---|
| 4,766,405 A * | 8/1988 | Daly et al. | 335/257 |
| 4,807,840 A * | 2/1989 | Baker et al. | 248/559 |
| 5,579,665 A | 12/1996 | Mott et al. | |
| 5,619,887 A | 4/1997 | Simpson | |

(Continued)

FOREIGN PATENT DOCUMENTS

| | | |
|---|---|---|
| CN | 1227624 | 9/1999 |
| CN | 2708042 | 7/2005 |

(Continued)

OTHER PUBLICATIONS

International Search Report for PCT/US2009/052920 mailed Mar. 12, 2010; 11 pages.

*Primary Examiner* — Troy Chambers
*Assistant Examiner* — Alexander Vu
(74) *Attorney, Agent, or Firm* — Brown & Michaels, PC

(57) ABSTRACT

A sprocket unit comprising: a damper mounted on the first shaft with a first face defining a recess and a second face defining chambers for receiving spring loaded weights; a sprocket mounted to the first shaft with a hub defining an aperture and a slot; a front end plate mounted on the shaft with a hub defining an aperture aligned with the aperture of the sprocket; and a spring received within the aperture of the sprocket, the aperture of the front end plate, and the recess of the damper. When the first shaft rotates and firing frequency of the engine coincides with a resonant frequency of the first shaft, the spring loaded weights slide in the chambers of the damper, dampening out the resonant frequency in the first shaft and when the sprocket rotates the spring compresses and extends, reducing torsional load of the first shaft on the second shaft.

8 Claims, 5 Drawing Sheets

(56) References Cited

U.S. PATENT DOCUMENTS

| | | | |
|---|---|---|---|
| 5,655,416 A * | 8/1997 | Mott et al. | 74/574.2 |
| 5,863,274 A | 1/1999 | Jackel | |
| 5,931,052 A * | 8/1999 | Zhao et al. | 74/574.4 |
| 6,155,942 A | 12/2000 | Ullein | |
| 6,161,512 A | 12/2000 | Beels Van Heemstede | |
| 6,234,127 B1 * | 5/2001 | Simpson et al. | 123/90.31 |
| 6,311,655 B1 * | 11/2001 | Simpson et al. | 123/90.17 |
| 6,382,164 B2 * | 5/2002 | Haas et al. | 123/192.1 |
| 6,468,173 B1 | 10/2002 | Jeong | |
| 6,672,264 B2 * | 1/2004 | Watanabe et al. | 123/90.17 |
| 6,827,056 B2 * | 12/2004 | Cholewczynski | 123/192.1 |
| 2003/0070643 A1 * | 4/2003 | Watanabe et al. | 123/90.17 |
| 2004/0250648 A1 * | 12/2004 | Chaugule | 74/574 |
| 2006/0086332 A1 * | 4/2006 | Simpson et al. | 123/90.17 |
| 2011/0132116 A1 * | 6/2011 | Simpson | 74/411 |

FOREIGN PATENT DOCUMENTS

| | | |
|---|---|---|
| JP | 02056962 U | 4/1990 |
| JP | 03098350 U | 10/1991 |
| JP | 09196122 A | 7/1997 |
| KR | 100337348 | 5/2002 |

* cited by examiner

SPROCKET WITH DAMPER AND COMPENSATOR

BACKGROUND OF THE INVENTION

1. Field of the Invention

The invention pertains to the field of sprockets. More particularly, the invention pertains to a sprocket with a damper and a compensator.

2. Description of Related Art

As modern vehicles and engine compartments become smaller, the requirement to have more compact engines becomes greater. One way to achieve this is to put the crankshaft damper inside the timing drive cover. Since this is an environment that is subjected to oil conditions, a damper must be able to tolerate these extreme conditions. Current dampers with rubber will not withstand the hot oil environment for the life of the vehicle. Also, as the electrification of accessories becomes common place, the need for the crankshaft to extend out of the engine is minimized.

SUMMARY OF THE INVENTION

A sprocket unit mounted to a shaft comprising a damper with recesses and chambers for receiving spring loaded weights; a sprocket mounted adjacent to the damper having a hub defining at least one aperture and at least one slot having a length; a front end plate mounted on the first shaft adjacent to the sprocket with a hub defining an apertures aligned with the apertures of the sprocket; and springs received within the apertures of the sprocket, the apertures of the front end plate, and the recesses of the damper. When the shaft rotates and the firing frequency of the engine is in tune with the resonant frequency of the first shaft, the spring loaded weights slide in the chambers of the damper to dampen out resonant frequency in the first shaft. The torsional load of the first shaft on the second shaft is decreased by the sprocket rotating an amount no greater than the length of the slot and the spring received within the damper, sprocket, and end plate extends and compresses, reducing the torsional load to the second shaft from the first shaft.

DETAILED DESCRIPTION OF THE INVENTION

The sprocket unit 50 of the present invention includes a compensator and a damper mounted together as a single unit on a first shaft. The compensator reduces torsional load of the first shaft relative to the second shaft and the damper dampens the vibrations and twisting motion of the first shaft when the resonance of the firing frequency of the engine coincides with the resonance of the first shaft. The damper of the sprocket unit 50 of the present invention is able to run in a hot oil environment for the life of the vehicle. The sprocket unit 50 may be mounted to a drive shaft or a driven shaft. The chain drive or belt in which the sprocket of the sprocket unit 50 engages may be used to drive many devices in the engine, including but not limited to a camshaft, electric motor, or balance shaft system.

Figure 1:
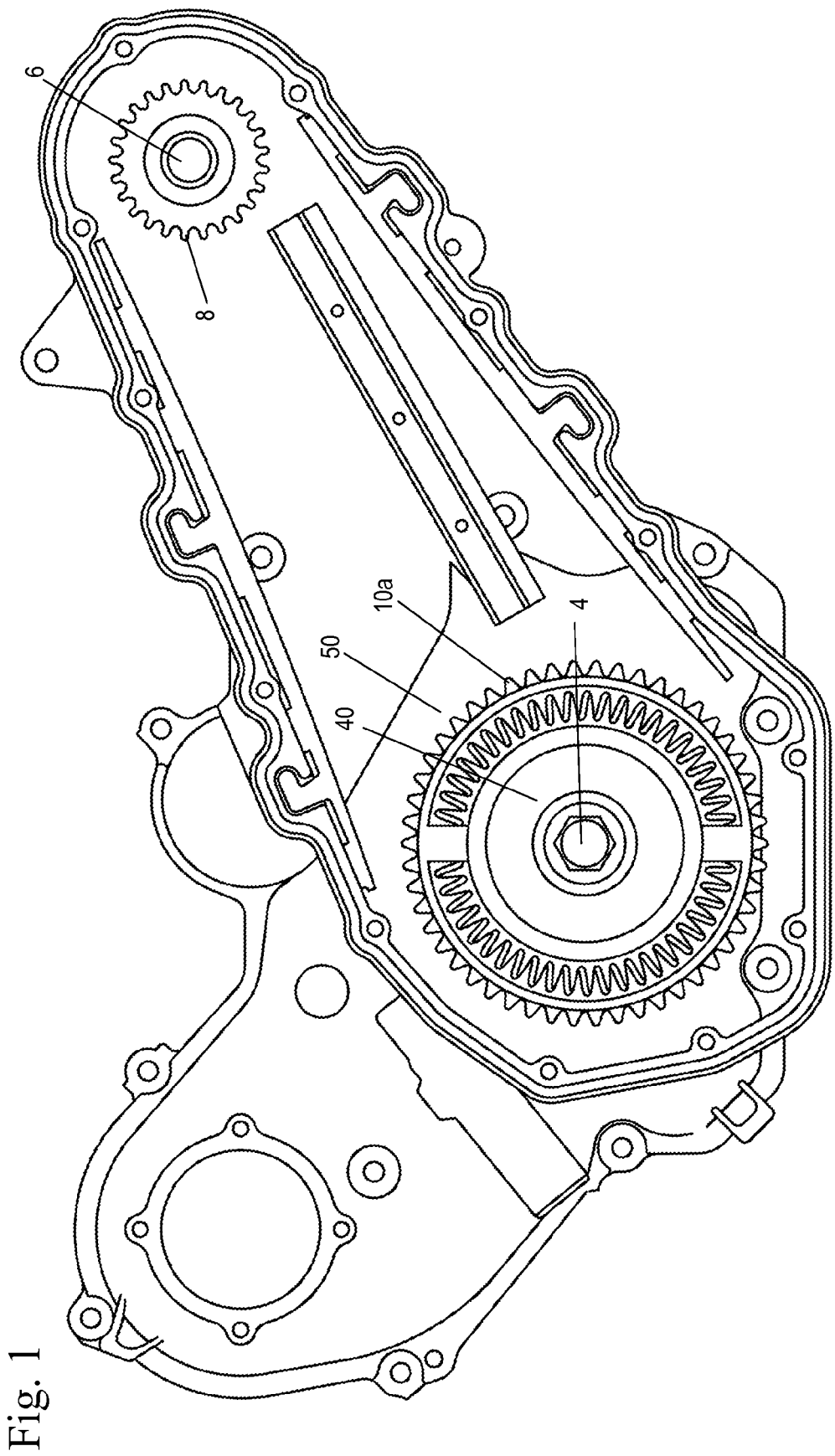
FIG. 1 shows a view of a drive system with the sprocket with a compensator and a damper of the present invention.
Figure 2:
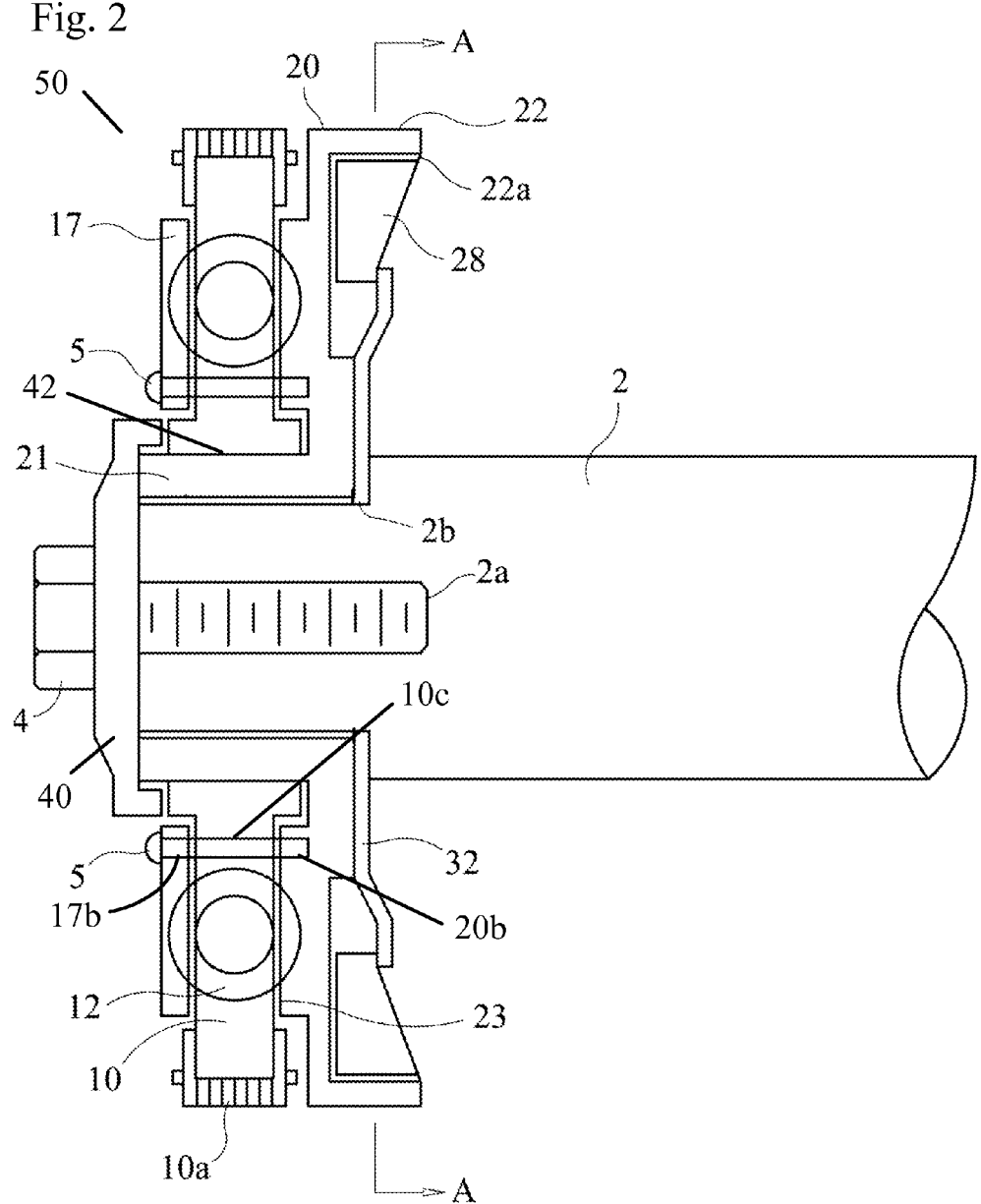
FIG. 2 shows a sectional view of the sprocket with a compensator and a damper of the present invention on a shaft.
Figure 3:
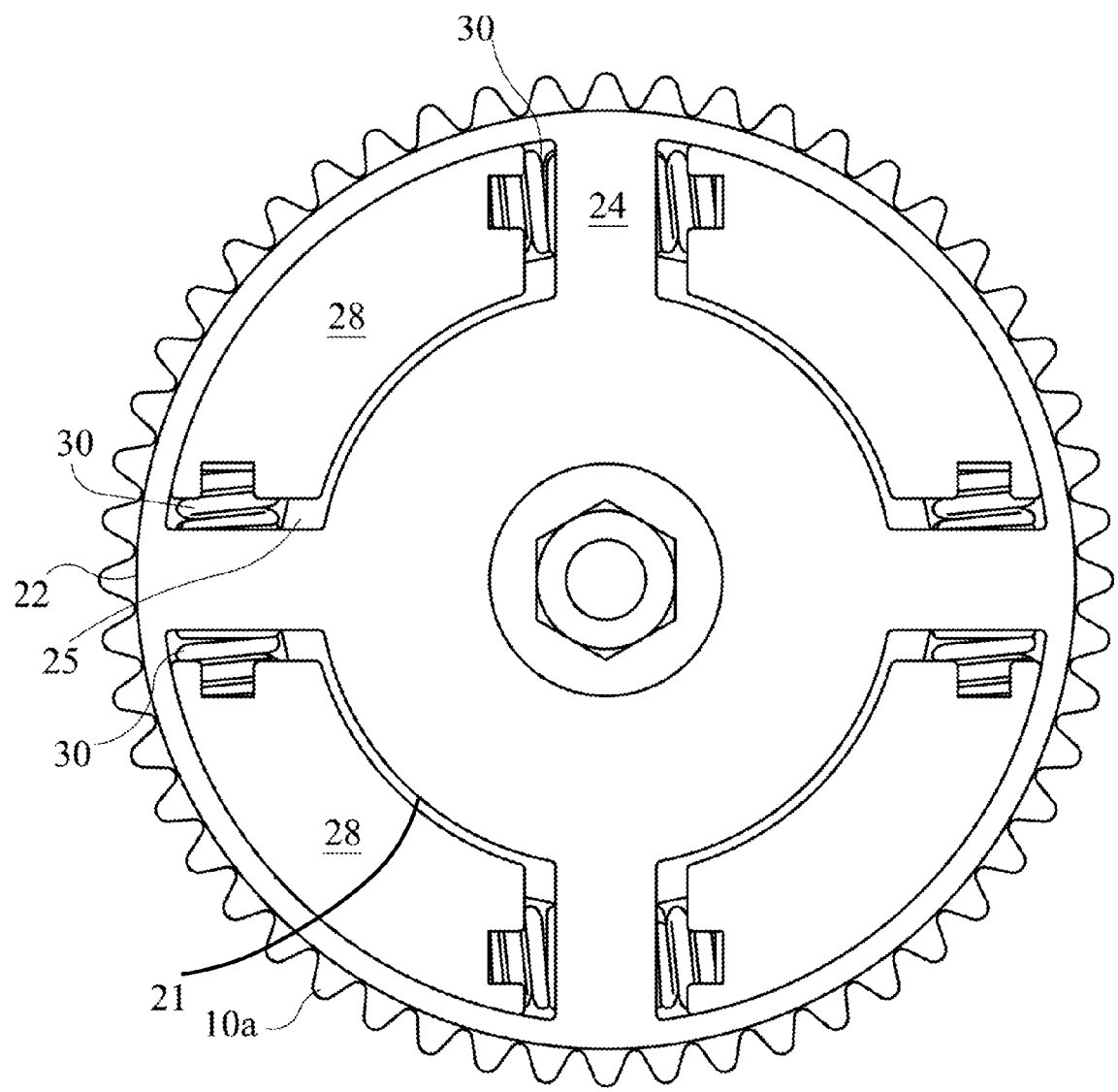
FIG. 3 shows a cross-section of the damper portion of the sprocket with a compensator and a damper along line A-A of FIG. 2.
Figure 4:
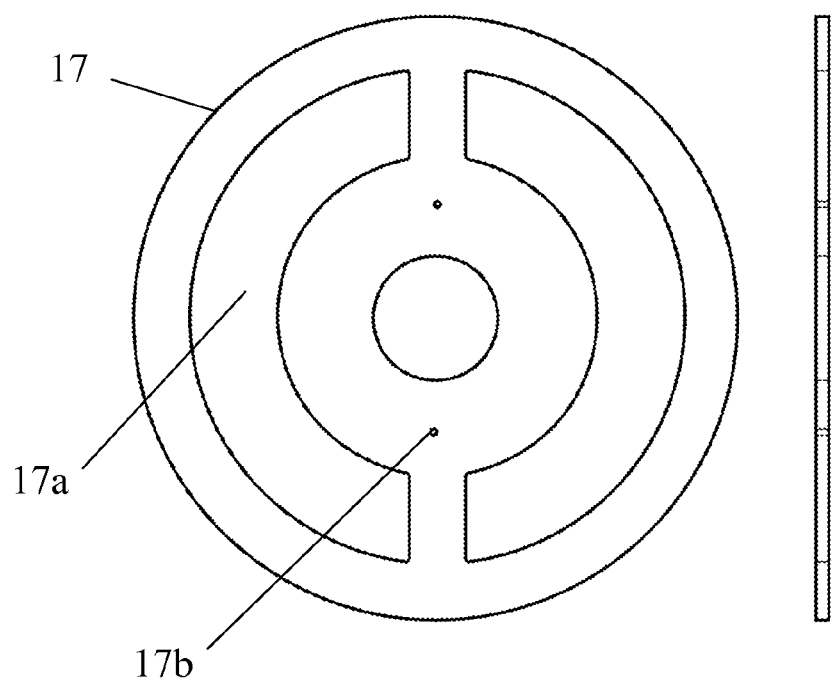
FIG. 4 shows an exploded view of the sprocket with damper and compensator of the present invention.
Figure 4:
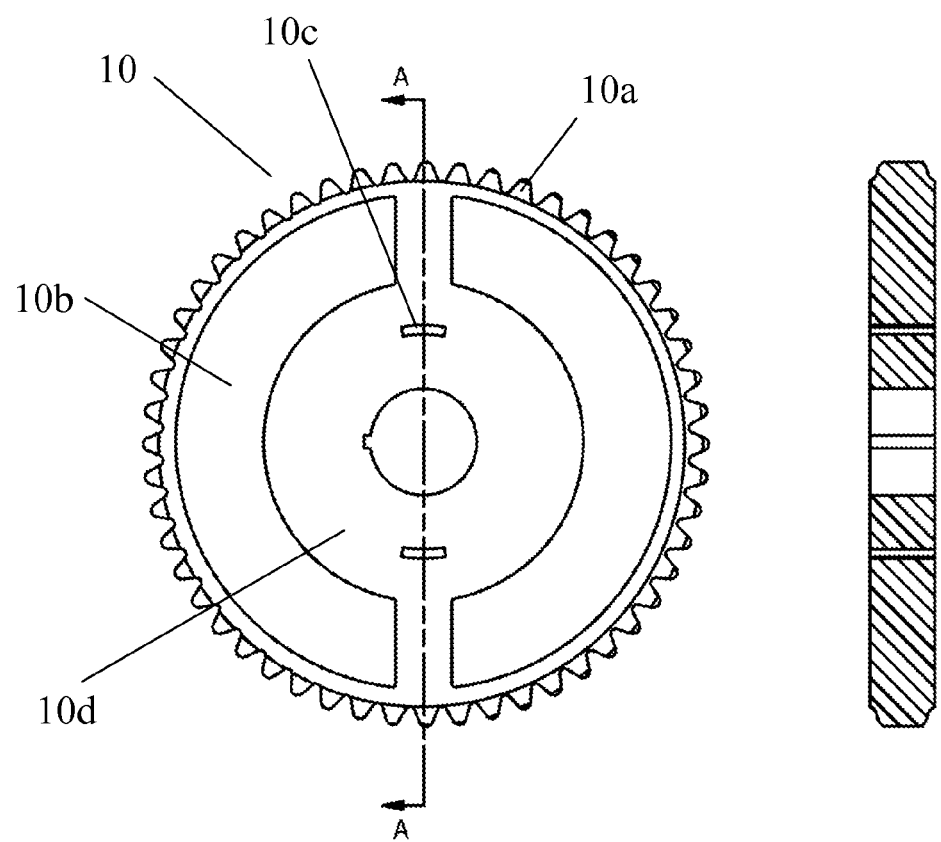
Figure 5:
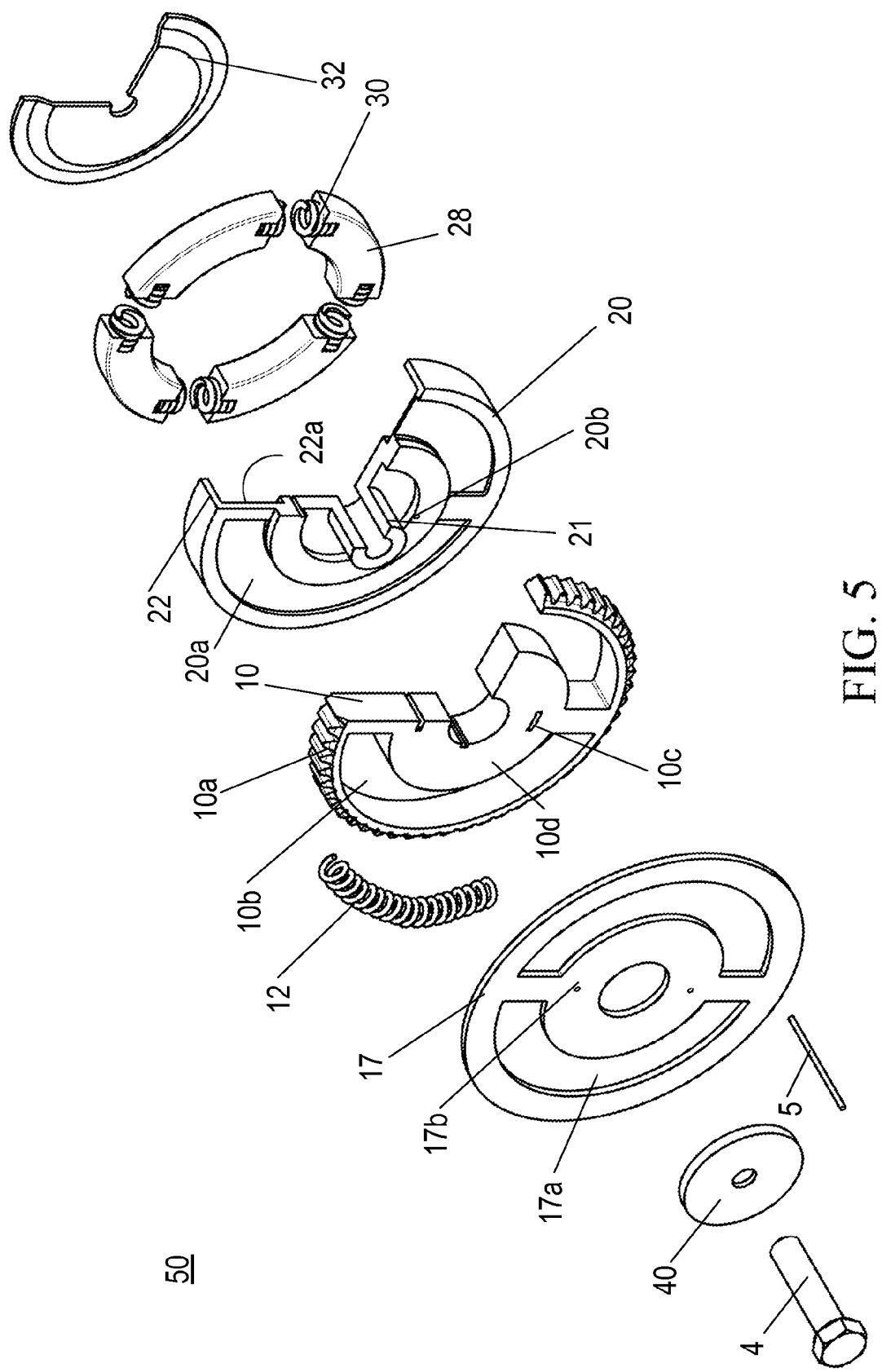
FIG. 5 shows a front and side view of the sprocket and the front plate.

FIGS. 1-5 show the sprocket unit 50 of the present invention. It should be noted that in FIG. 1 the chain lid has been removed from the figure for clarity. The sprocket unit 50 is mounted to the reduced diameter portion 2b of shaft 2 and is held in position by a bolt 4 received within a bore 2a of the first shaft 2 and a washer 40.

The sprocket 10 is mounted to a first shaft 2 at a reduced diameter portion 2b. The sprocket 10 has a toothed outer periphery 10a that meshes with and engages an endless chain (not shown) to transfer rotary motion and torque. Alternatively, the sprocket 10 may be designed to engage a belt. The endless chain (not shown) is also wrapped around a second sprocket 8 on a second shaft 6 which is spaced a distance away from the sprocket 10. The sprocket 10 has at least one semicircular aperture 10b, but preferably at least two apertures are present as shown on the hub 10d or the sprocket face that receives compensator springs 12. The sprocket face or hub 10d as used in this description refers to the portion of the sprocket that does not contain sprocket teeth 10a. Also on the hub 10d of the sprocket is a slot 10c extending a length. The slot 10c receives a bolt 5. The length of the slot 10c provides a clearance for the bolts 5 to slide back and forth as the sprocket 10 rotates to reduce the torsional load from the first shaft 2 to the second shaft 6.

On a first side of the sprocket 10, a front end plate 17 is mounted to the first shaft 2 at the reduced diameter portion 2b. The front plate 17 is bolted and fixed to the sprocket 10 by bolts 5. The bolts 5 are received by holes 17b present along the hub of the front end plate 17. Also located on the face of the front end plate 17 are at least one semi-circular aperture 17a, however, preferably two apertures are present as shown, that correspond to and align with the semi-circular aperture 10b in the sprocket 10 and receive a portion of the compensator springs 12. On the other side of the front end plate 17, opposite the side adjacent to the sprocket 10, a washer 40 is present.

On the second side of the sprocket 10, opposite the first side, is a damper 20 with a first face adjacent to the sprocket 10 and a second face adjacent to a back plate 32. On the first face of the damper 20 is at least one semicircular recess 20a, although preferably two recesses are present as shown, that correspond to and align with the semi-circular aperture 10b in the sprocket 10, and the semi-circular aperture 17a of the front end plate 17 and receive a portion of the compensator springs 12. The damper 20 is held in place on the first shaft 2 by the washer 40. Bolts 5 hold front end plate 17 relative to the sprocket 10 and the damper 20. The bolts 5 are received by holes 20b present along the hub of the damper 20. The damper 20 is defined by an inner annular wall 21, an outer annular wall 22, and an end wall 23. The inner wall 21 extends radially from the first face of the damper 20 along the reduced diameter portion 2b of the first shaft 2. A bearing surface 42 is created between the sprocket 10 and a portion of the inner wall 21 that extends radially along the reduced diameter portion of the first shaft 2. The outer annular wall 22 extends and defines the outer periphery of the damper 20 and forms a portion defining chambers 25. The end wall 23 of the damper 20 extends transversely between the inner and outer walls 21, 22, with partitions 24 extending diametrically between the inner and outer walls 21, 22 to divide part of the second face of the damper 20 into chambers 25. Inertia weights 28 and springs 30 are received within the chambers 25. Springs 30 on either side of the inertia weights 28 allow the inertia weights 28 to move or slide along the inside 22a of the outer wall 22 to dampen out resonance or a resonant frequency in the first shaft 2. A back plate 32 prevents the inertia weights 28 from moving radially out of the chambers 25.

As the first shaft 2 rotates, the sprocket unit 50 rotates with the first shaft 2. When the firing frequency of the engine coincides with or is equivalent to the resonant frequency of the first shaft 2, the inertia weights in chambers 25 on the second face of the damper 20 slide along the inside 22a of the outer wall 22 to dampen out the resonance excitation in the first shaft 2. Additionally, the sprocket 10 may rotate an amount no greater than the length of the slot 10c to reduce the torsional load of the first shaft 2 on the second shaft 6 by compressing and extending the compensator springs 12.

While two semi-circular apertures 1% on the sprocket 10 are shown, four or six semi-circular apertures equally spaced along the face or hub of the sprocket 10 may also be used. It should be noted that if the number of apertures were to increase or decrease, a corresponding number of apertures would have to be present on the front plate 17 and the front face of the damper 20.

The damper 20 of the sprocket unit 50 is preferably a friction or tuned absorber, although a coulomb damper may also be used. Other methods of compensation may be used without deviating from the scope of the invention.

Friction material may be added to the inertia weights to change the damping characteristics as necessary.

The sprocket unit 50 may be used with any shaft that rotates and has torsional oscillation and drives another shaft either by means of a chain, belt or gear.

The sprocket unit 50 can run in hot or cold oil.

The sprocket unit 50 may also perform in a non-lubricated environment if the components were plated to prevent rust and the friction material is such that it will perform in the non-lubricated environment.

Accordingly, it is to be understood that the embodiments of the invention herein described are merely illustrative of the application of the principles of the invention. Reference herein to details of the illustrated embodiments is not intended to limit the scope of the claims, which themselves recite those features regarded as essential to the invention.

What is claimed is:

1. An engine system including an engine, a first shaft, a second shaft, and a single sprocket unit mounted to at least the first shaft, the sprocket unit comprising:
    a damper mounted on the first shaft, the damper having a first side with a first face and a second side axially opposite the first side, the second side having a second face, the first face defining at least one recess and the second face defining a plurality of chambers, each chamber receiving a spring loaded weight;
    a sprocket mounted to the first shaft axially adjacent to the first face of the damper, the sprocket comprising a sprocket outer periphery for accepting a drive force and a sprocket hub defining at least one sprocket aperture, extending axially through the sprocket hub and aligned with the at least one recess, and at least one slot having a length;
    a front end plate mounted on the first shaft adjacent to the sprocket, the front end plate comprising a front end plate hub defining at least one front end plate aperture aligned with the at least one sprocket aperture; and
    at least one spring received within the at least one sprocket aperture, the at least one front end plate aperture, and the at least one recess of the damper;
    wherein when the first shaft rotates and a firing frequency of the engine coincides with a resonant frequency of the first shaft, the spring loaded weights slide in the chambers of the damper, dampening out the resonant frequency in the first shaft; and
    wherein the sprocket rotates with respect to the damper and the front end plate an amount no greater than the length of the slot, compressing and extending the at least one spring, reducing torsional load of the first shaft on the second shaft.

2. The engine system of claim 1, further comprising a back plate mounted to the second face of the damper, preventing the weights from moving radially outward from the chambers.

3. The engine system of claim 1, wherein the damper further comprises a damper outer periphery defined by an outer wall, the first face including an inner wall extending radially along a portion of the first shaft, and the second face comprising an end wall extending transversely between the inner wall and outer wall including partitions extending diametrically between the inner and outer walls, such that the partitions, the outer wall and the end wall define the chambers.

4. The engine system of claim 3, wherein a bearing surface is present between the sprocket and the inner wall of the damper.

5. The engine system of claim 1, further comprising a second sprocket unit mounted to the second shaft.

6. The engine system of clam 1, wherein the spring loaded weights further comprise a friction material.

7. The engine system of claim 1, wherein the damper is a friction absorber.

8. The engine system of claim 1, wherein the damper is a coulomb damper.

* * * * *